United States Patent
Matsue et al.

(10) Patent No.: US 8,254,309 B2
(45) Date of Patent: Aug. 28, 2012

(54) WIRELESS COMMUNICATION EQUIPMENT SYSTEM FOR WIRELESS LOCAL AREA NETWORK COMMUNICATION, AND WIRELESS COMMUNICATION SEQUENCE FOR THE SYSTEM

(75) Inventors: Kiyotaka Matsue, Yokohama (JP); Noriyasu Kato, Tokyo (JP); Youichirou Shiba, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1285 days.

(21) Appl. No.: 11/961,063

(22) Filed: Dec. 20, 2007

(65) Prior Publication Data

US 2008/0151852 A1 Jun. 26, 2008

(30) Foreign Application Priority Data

Dec. 20, 2006 (JP) ................................. 2006-343168

(51) Int. Cl.
  *H04W 4/00* (2009.01)
(52) U.S. Cl. ........................................ 370/328; 370/338
(58) Field of Classification Search ................... None
  See application file for complete search history.

(56) References Cited

U.S. PATENT DOCUMENTS

| | | | |
|---|---|---|---|
| 2001/0055356 A1* | 12/2001 | Davies | 375/358 |
| 2003/0103521 A1* | 6/2003 | Raphaeli et al. | 370/445 |
| 2004/0120285 A1* | 6/2004 | Paila et al. | 370/331 |
| 2005/0237965 A1* | 10/2005 | Kuperschmidt et al. | 370/321 |
| 2006/0206783 A1 | 9/2006 | Nishihara et al. | |
| 2007/0115905 A1 | 5/2007 | Jokela et al. | |
| 2007/0168822 A1* | 7/2007 | Vitebsky et al. | 714/748 |

OTHER PUBLICATIONS

IEEE 802.11e/D13.0, Jan. 2005: ANSI/IEEE Std. 802.11-1999[2003 Reaff] Edition.
Information Technology Telecommunications and Information Exchange Between Systems Local and Metropolitan Area Networks Specific Requirements, Part II: Wireless LAN Medium Access Control (MAC) and Physical Layer (PHY) Specification, ANSI, IEEE-SA Standards Board, 802.11, 1999 Edition (R2003).

* cited by examiner

*Primary Examiner* — John Blanton
(74) *Attorney, Agent, or Firm* — Turocy & Watson, LLP (57) ABSTRACT

A wireless communication equipment system which performs wireless communication among one master station and more than one slave station is configured so that each of the slave stations requests the master station to reply acknowledgement frames so as to perform transmission acknowledgement to broadcast frames or multicast frames transmitted from the master station. The master station is configured to decide order of replies of the acknowledgement frames of the slave stations which have requested the replies of the acknowledgement frames and to notify the order of the replies of the acknowledgement frames.

8 Claims, 10 Drawing Sheets

| Name(Field) | Byte | Value | Description |
|---|---|---|---|
| Frame Control | 2 | - | Use as Action frame |
| Duration / ID | 2 | - | - |
| Address 1 | 6 | - | - |
| Address 2 | 6 | - | - |
| Address 3 | 6 | - | - |
| Sequence Number | 2 | - | - |
| Address 4 | 6 | - | - |
| QoS control field | 2 | - | - |
| Category | 1 | 4 | Add new number |
| Action | 1 | 0-2 | Grant action number within new Category |
| Dialog Token | 1 | - | - |
| BCMC policy | 2 | | Newly add BCMC policy |
| ACK order | variable | | Specify order of ACK frame transmission for BCMC (Beacon frame). ADDBCMC request frame reception terminal (AP) decides order. Therefore, order is granted only through ADDBCMC response frame. |
| FCS | 4 | - | - |

FIG. 3

| Meaning | Value | Description |
|---|---|---|
| BC / MC Ack | 4 | Use as ADDBCMC request frame, ADDBCMC response frame and DELBCMC frame |

FIG. 4

| Meaning | Value | Description |
| --- | --- | --- |
| ADDBCMC request | 0 | Use as ADDBCMC request frame |
| ADDBCMC response | 1 | Use as ADDBCMC response frame |
| DELBCMC | 2 | Use as DELBCMC frame |
| BCMC report | 3 | Use as BCMC report frame |
| reserved | 4-255 | Reserved |

FIG. 5

| Meaning | Byte | Value | Description |
| --- | --- | --- | --- |
| BCMC Type | 1 | 0-2 | Bit 0: Applicability to BC (broadcast frame)<br>0: Not applicable, 1: applicable<br>Bit 1: Applicability to MC (multicast frame)<br>0: Not applicable, 1: applicable<br>Bits 2-7: Reserved |
| ID Type | 1 | 0-1 | Set types of identifiers<br>0: MAC address<br>1: AID<br>2-255: Reserved |

FIG. 6

| Meaning | Byte | Value | Description |
| --- | --- | --- | --- |
| ACK order | variable | - | State transmission order of ACK frames (BA frames) |

FIG. 7

| Meaning | Byte | Value | Description |
|---|---|---|---|
| Element ID | 1 | | Element ID |
| Length | 1 | variable | Set size (byte number) except Element ID and Length |
| ID type | 1 | | Insert types of identifiers. Use same types of identifiers as those of BCMC policy |
| ID | Variable | | Insert identifiers. Insert identifiers of needed number thereof (a plurality of identifiers may be registered) |
| Padding | 1 | 0 | Apply padding as need arises so element size becomes even bytes |

FIG. 8

| Meaning | Description |
|---|---|
| STA identification information | Store information to identify STA such as MAC address, AID and TID |
| BCMC policy | Information on whether ACK frame transmission to BCMC data frame is performed |

WIRELESS COMMUNICATION EQUIPMENT SYSTEM FOR WIRELESS LOCAL AREA NETWORK COMMUNICATION, AND WIRELESS COMMUNICATION SEQUENCE FOR THE SYSTEM

CROSS-REFERENCE TO RELATED APPLICATIONS

This application is based upon and claims the benefit of priority from prior Japanese Patent Application No. 2006-343168, filed Dec. 20, 2006, the entire contents of which are incorporated herein by reference.

BACKGROUND OF THE INVENTION

1. Field of the Invention

This invention relates to a wireless communication equipment system and a wireless communication sequence for the same. More specifically, the present invention relates to a wireless communication equipment system capable of communicating through broadcast (BC) frames and multicast (MC) frames under a wireless local area network (LAN) environment, and a wireless communication sequence for the system.

2. Description of the Related Art

Recently, wireless LAN communication as wireless communication equipment systems has become widely used. Communication, which is implemented in accordance with a frame format and a communication control protocol specified in the Institute of Electrical and Electronics Engineers (IEEE) 802.11 standard, can be regarded as the wireless LAN communication (e.g., refer to IEEE 802.11:ISO/IEC8802-11: 1999(E) ANSI/IEEE Std. 802.11, 1999 Edition).

As regards a data communication system in a medium access controller (MAC) layer level based on the IEEE 802.11 standards of this wireless LAN communication, three kinds of systems are defined. The three kinds of systems include a unicast system performing a data transmission to a specified one terminal, a broadcast system performing data transmissions to all the terminals and a multicast system performing data transmissions to one or more specified terminals. Among of them, the unicast system adopts a scheme conducting transmission acknowledgement for the data transmission. However the scheme of the transmission acknowledgement for the data transmission is not adopted into the broadcast system and the multicast system. Therefore, in the case of the broadcast system and the multicast system, even if a frame loss occurs and a side of a partner's (reception) terminal cannot receive a frame, a side of a transmission terminal cannot recognize the fact, and cannot perform a re-transmission of the frame.

That is, a protocol sequence using control and a management frame stated in the IEEE 802.11e standards and standards compliant with these standards (refer to, e.g., IEEE 802.11e/D13.0, January 2005: ANSI/IEEE Std. 802.11-1999 [2003 Reaff] Edition) cannot perform an acknowledgement (ACK) transmission by means the broadcast frame and the multicast frame. In other words, the broadcast system and the multicast system stated in the IEEE 802.11 standards of the wireless LAN communication does not include a scheme in which the side of the transmission terminal recognizes whether or not the side of the partner's terminal has received the frame. Therefore, even when the frame loss occurs, the re-transmission of the lost frame may not be implemented.

In contrast, in the case of the unit cast frames since the scheme of the transmission acknowledgement has been established fundamentally, applying the scheme to the broadcast frame or the multicast frame is a possible approach. However, since the applying of the scheme to the broadcast frame or the multicast frame generates a collision of transmission confirmation frames in a wireless section, the wireless communication system encounters such a problem that it cannot normally transmit the acknowledgement frame to the side of the transmission terminal.

BRIEF SUMMARY OF THE INVENTION

According to a first aspect of the present invention, there is provided a wireless communication equipment system which performs wireless communication among one master station and more than one slave station, wherein each of the slave stations is configured to request the master station to reply of acknowledgement frames so as to perform transmission acknowledgement to broadcast frames or multicast frames transmitted from the master station; and the master station is configured to decide order of replies of the acknowledgement frames for the slave stations which have requested the replies of the acknowledgement frames and to notify the order of the replies of the acknowledgement frames.

According to a second aspect of the present invention, there is provided a wireless communication sequence of a wireless communication equipment system which performs wireless communication among one master station and more than one slave station comprises:

requesting replies of acknowledgement frames to broadcast frames or multicast frames from arbitrary slave station among the slave stations to the master station and establishing a transmission sequence of acknowledgement frames among the master station and the arbitrary station by replying from the master station to the request;

deciding order of the replies of the acknowledgement frames from the master station to the arbitrary slave station:

using Beacon frames to be transmitted periodically from the master station or broadcast and multicast (BCMC) report frames to be transmitted on an irregular base and notifying order of replies of the acknowledgement frames to all the slave stations;

transmitting the broadcast frames or multicast frames from the master station to all the slave stations; and transmitting the acknowledgement frames from the arbitrary slave station to the broadcast frames or the multicast frames transmitted from the master station in response to the order of the replies of the acknowledgement frames.

DETAILED DESCRIPTION OF THE INVENTION

Embodiments of the present invention will be described with reference to the accompanying drawings. It should be noted that the drawings are schematic ones and the dimension rations shown therein are different from the actual ones. The dimensions vary from drawing to drawing and so do the rations of dimensions. The following embodiments are directed to a device and a method for embodying the technical concept of the present invention and the technical concept does not specify the material, shape, structure or configuration of components of the present invention. Various changes and modifications can be made to the technical concept without from the scope of the claimed invention.

First Embodiment

Figure 1:
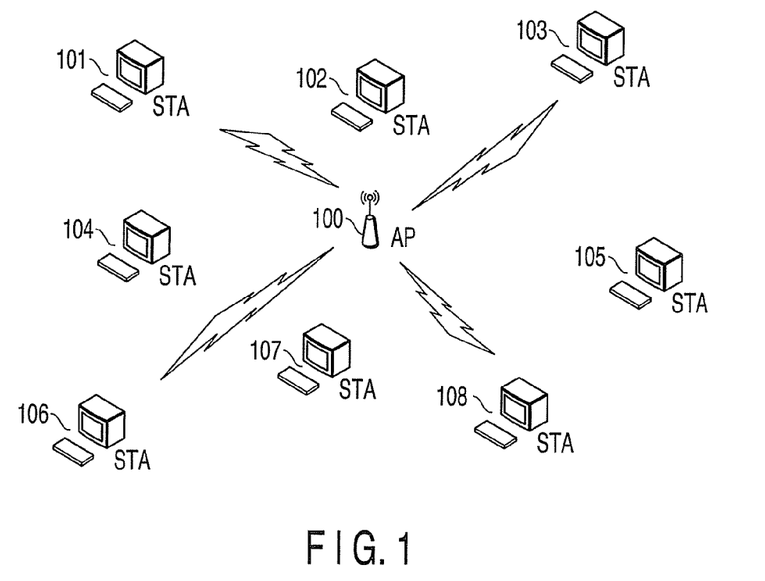
FIG. 1 is view illustrating a preferred configuration example of a wireless communication equipment system in accordance with the first embodiment of the present invention.

FIG. 1 shows a configuration example of a wireless communication equipment system in accordance with the first embodiment of the present invention. The first embodiment explains by way of example of the case in which a frame enabling option communication is applied to a frame format and a protocol sequence of a MAC layer in the IEEE 802.11 and IEEE 802.11e standards of wireless LAN communication. That is, a scheme to perform transmission acknowledgement in transmissions of broadcast frames and multicast frames in a wireless LAN communication system will be described.

In the system of this embodiment, for example, the communication by means of broadcast frames and the multicast frame among one AP 100 that is a master station and eight STAs 101-108 that are slave stations is performed, as shown in FIG. 1. The AP 100 is mainly a transmission terminal in the communication system and manages all the STAs 101-108. The STAs 101-108 are mainly partner's terminals in the communication system.

Figure 2:
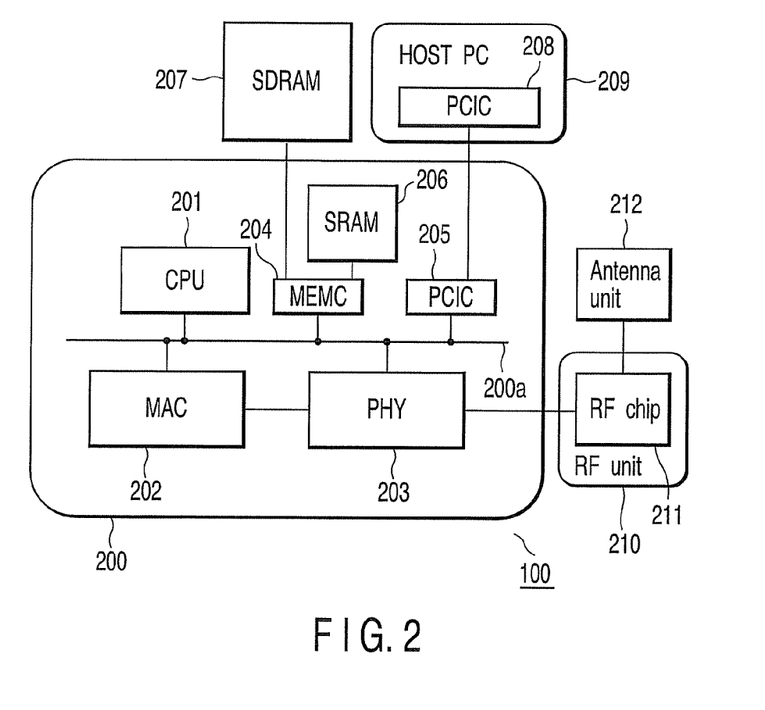
FIG. 2 is a block diagram illustrating a preferred configuration example of an access point (AP) in the wireless communication equipment system depicted in FIG. 1.

FIG. 2 shows a configuration example of the AP 100. The AP 100 includes a wireless LAN base-band chip 200. A central processing unit (CPU) 201, a medium access controller (MAC) 202, a physical layer (PHY) 203, a memory controller (MEMC) 204, a peripheral components interconnect controller (PCIC) 205 and a static random access memory (SRAM) 206 are disposed on the chip 200. The CPU 201, MAC 202, PHY 203, MEMC 204 and PCIC 205 are connected with one another via a bus 200a.

The MAC 202 and a radio frequency (RF) 210 are connected to the PHY 203. An RF chip 211 is disposed in the RF unit 210. An antenna unit 212 is connected to the RF chip 211.

The SRAM 206 and a synchronous dynamic RAM (SDRAM) 207 are connected to the MEMC 204.

A PCIC 208 of a host personal computer (HOST PC) 209 is connected to the PCIC 205.

In the foregoing configuration, when data is transmitted, the data transmitted from the PCIC 208 of the HOST PC 209 is stored in the SRAM 206 and/or the SDRAM 207 through the OCIC 205, the bus 202a, and the MECM 204. Access to the SRAM 206 and the SDRAM 207 is always performed via the MEMC 204.

The data stored in the SRAM 206 and/or the SDRAM 207 is processed by the CPU 201 then passes through the MAC 202 and the PHY 203 to be transmitted to the RD unit 210. Finally, the data is transmitted from the RF chip 211 to the antenna unit 212, and is transmitted as frames for wireless LAN communication from the antenna init 212.

In receiving the data, a reverse operation (flow) is performed. Since the configurations and operations of the STAs 101-108 are the same as that of the AP 100, explanations therefor will be omitted here.

The processing regarding the embodiments given below may be implemented through any of software and hardware. If the processing is implemented through the hardware, the MAC 202 has charge of the processing, and if the processing is implemented through the software, the CPU 201 has charge of the processing.

Next, an outline of the control protocol to be used in the embodiment under a wireless LAN communication environment will be described. FIGS. 3 to 8 each depict examples of frame formats to be used as control protocols. To be easily understood, the description given below, the case in which one AP and more than one STAs perform data transmissions in the broadcast system or the multicast system under a wireless LAN communication environment compliant with the IEEE 802.11 and IEEE 802.11e standards of the wireless LAN communication will be brought into review. As an example, it is considered, as its example, to be that one AP and more than one STA performs the data transmission in the broadcast system or the multicast system under the wireless LAN communication compliant with the IEEE 802.11 and IEEE 802.11e standards. As one example, it is considered to be that multicast frames are simultaneously transmitted from one AP 100 to two STA1 and STA2 (e.g., the SATs 101, 102) present in one basic service set (BSS). However, it is assumed that the AP 100 and the STAs 101, 102 are in an environment (a communicable state [State 3] stated in the IEEE 802.11 wireless LAN standards) in which a control protocol for establishing communication has already operated and they may communicate with one another.

Frame formats depicted in FIG. 3 to FIG. 8 show frames not being present in the existing wireless LAN communication protocol. In the first embodiment, since the frame format basically inherits the frame format of the wireless LAN communication, partial changes and additions are needed (arrow parts in figures). A basic frame is an action frame to be used in the IEEE 802.11e standards of the wireless LAN communication. The IEEE 802.11e standards of the wireless LAN communication are used as the base because they are considered to be that an expansion to a block acknowledgement (BA) function realizing an acknowledgement response to a plurality of frames by one frame. However, as regarding an acknowledgement frame, the first embodiment covers up to a usual ACK frame.

Figure 3:
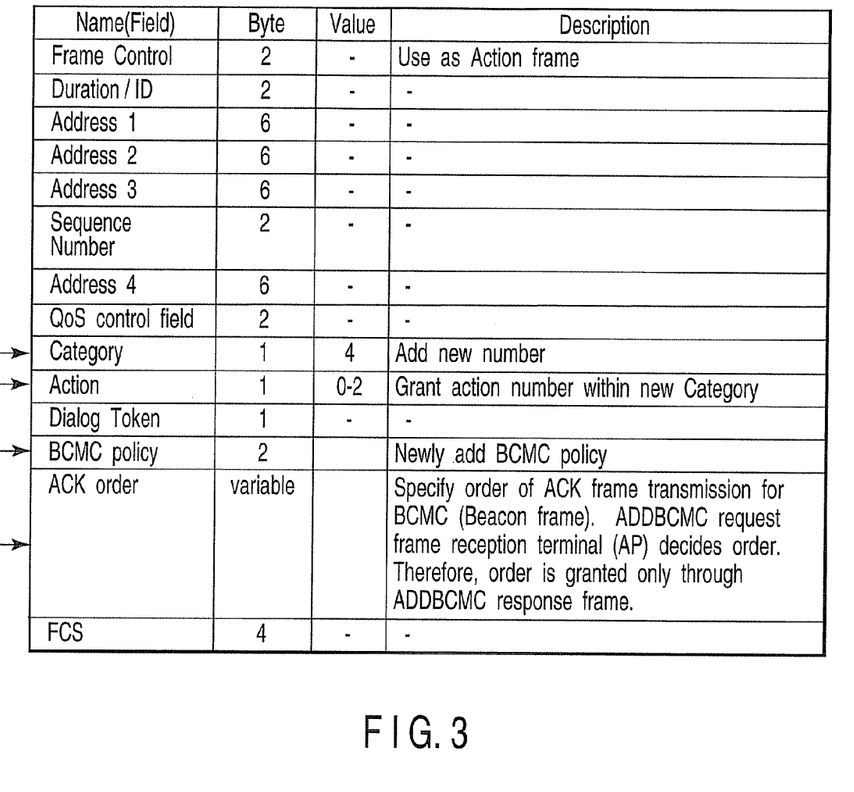
FIG. 3 is a view illustrating a frame format in the wireless communication equipment system depicted in FIG. 1.

FIG. 3 depicts the detail of the frame format. In the case of this embodiment, a 'Category Field', an 'Action Field', a 'BCMC policy Field' and an 'ACK order Field' are newly added (or changed) to/into the existing frame format.

The frame format is applied to an ADDBCMC request frame, an ADDBCMC response frame, a BCMC report frame, and a DELBCMC frame. The ADDBCMC request frame is a frame to be used in the case of a request for ACK frame transmissions to the BCMC data frame. The ADDBCMC response frame is a frame to be used as a reply frame to the ADDBCMC request frame. The DELBCMC frame is a frame to be used in terminating ADDBCM (a request for ACK frame transmissions to a BCMC data frame). The BCMC report frame is a frame to be used in allowing the ACL frame transmissions and is transmitted from the AP 100 on an irregular base.

This embodiment uses the Beacon frame instead of the BCMC report frame. The Beacon frame is a frame (information management frame) so as to inform the order of ACK frame transmissions to the BCMC data frame to the STAs 101, 102, and is added as a new element. The Beacon frame is periodically transmitted from the AP 100 in accordance with management information (e.g., beacon transmission timing information) to be decided by a protocol.

Figure 4:
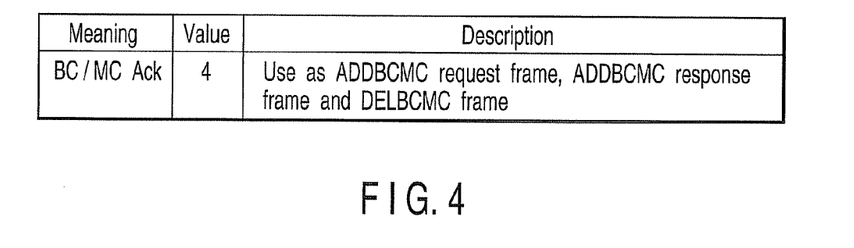
FIG. 4 is a view illustrating a 'Category Field' of the frame format depicted in FIG. 3.

FIG. 4 shows the detail of the 'Category Field' of the frame format depicted in FIG. 3. The BC/MC Ack is used for the ADDBCMC request frame, the ADDBCMC response frame, and the DELBCMC frame.

Figure 5:
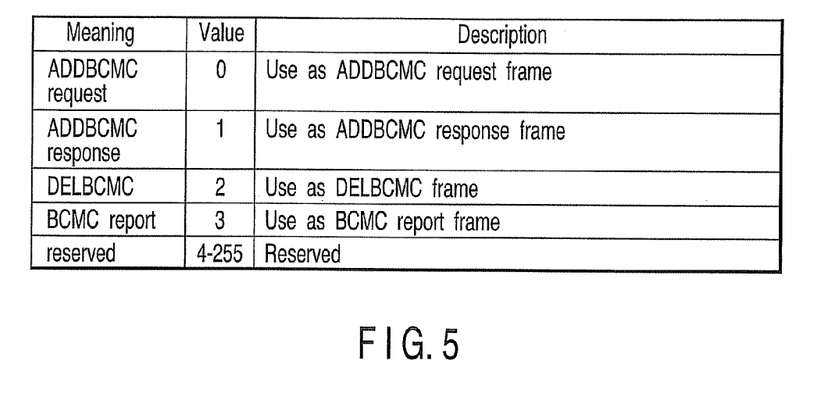
FIG. 5 is a view illustrating an 'Action Field' of the frame format depicted in FIG. 3.

FIG. 5 shows the detail of the 'Action Field' of the frame format depicted in FIG. 3. The ADDBCMC request us used as the request frame. The ADDBCMC response is used as the ADDBCMC response frame. The DELBCMC is used as the DELBCMC frame. The ADDBCMC response is used as the ADDBCMC response frame. The DELBCMC is used as the DELBCMC frame. The BCMC report is used as the BCMC report frame.

Figure 6:
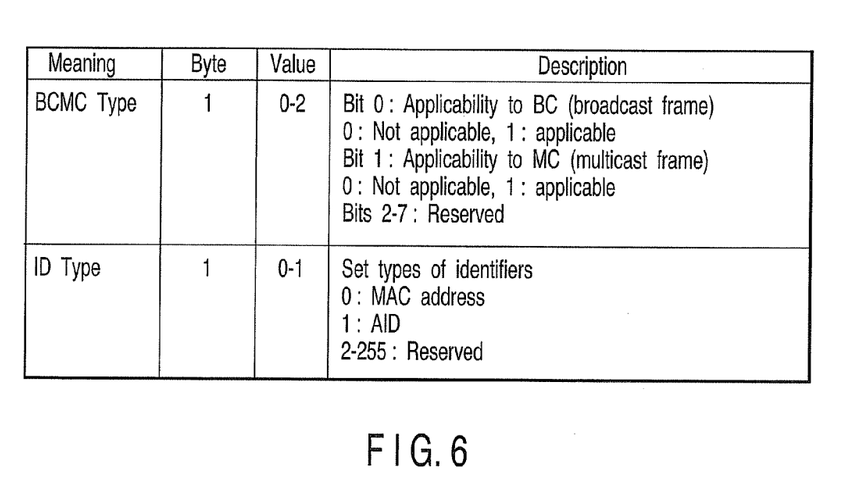
FIG. 6 is a view illustrating a 'BCMC policy Field' of the frame format depicted in FIG. 3.

FIG. 6 shows the detail of the 'BCMC policy Field' of the frame format depicted in FIG. 3. The 'BCMC policy Field' is a newly added field, and a 'BCMC Type' and an 'ID Type' are prepared. The 'BCMC Type' determines the propriety of an application to the broadcast (BC) and the multicast (MC). The 'ID Type' sets kinds of identifiers.

Figure 7:
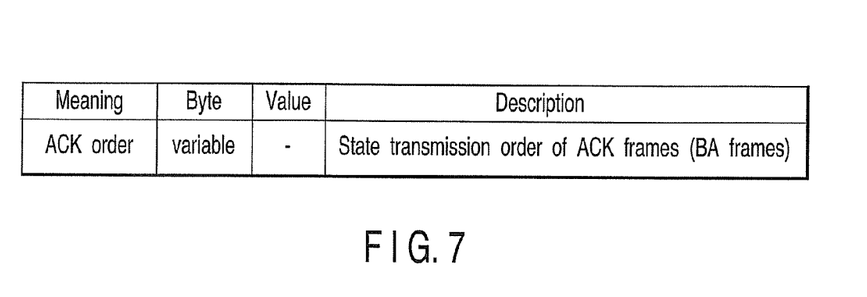
FIG. 7 is a view illustrating 'ACK order Field' of the frame format depicted in FIG. 3.

FIG. 7 shows the detail of the 'ACK order Field' of the frame format shown in FIG. 3. The 'ACK order Field' provides the order of transmissions of the ACK frames and the BA frames.

Figure 8:
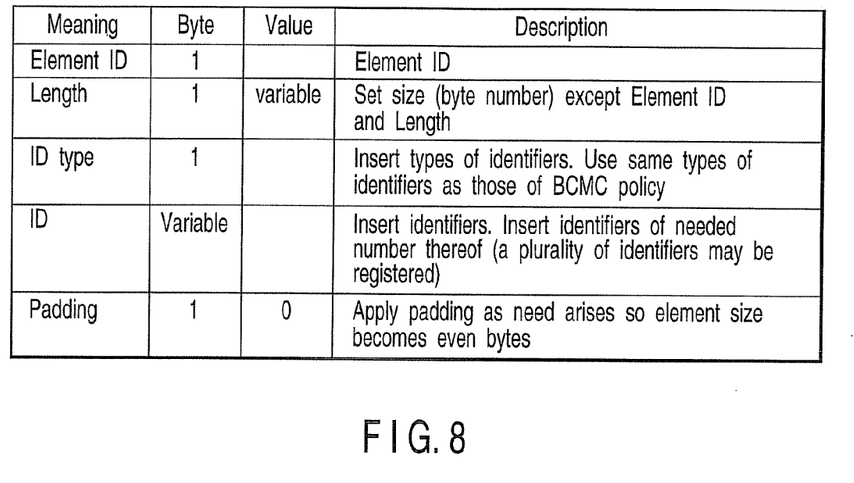
FIG. 8 is a view illustrating elements included in a 'Beacon frame' and a 'BCMC report frame'.

FIG. 8 depicts the detail of elements included in the 'Beacon frame' and the 'BCMC report frame'. As for the elements, an 'Element ID', a 'Length', an 'ID type', an 'ID' and 'Padding' are prepared. 'Element ID' is an ID in order to identify a pack of information (element) to be inserted into the Beacon frame, etc.

Figure 9:
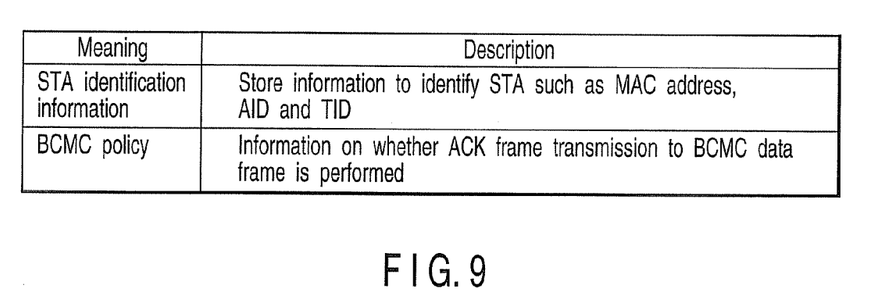
FIG. 9 is a view illustrating a preferred configuration example of a management table of the AP in the wireless communication equipment system depicted in FIG. 1.

FIG. 9 depicts a configuration example of a management table of the AP 100 to be used in the first embodiment. The management table is stored, for example, in the SRAM 206 and the SDRAM 207.

Figure 10:
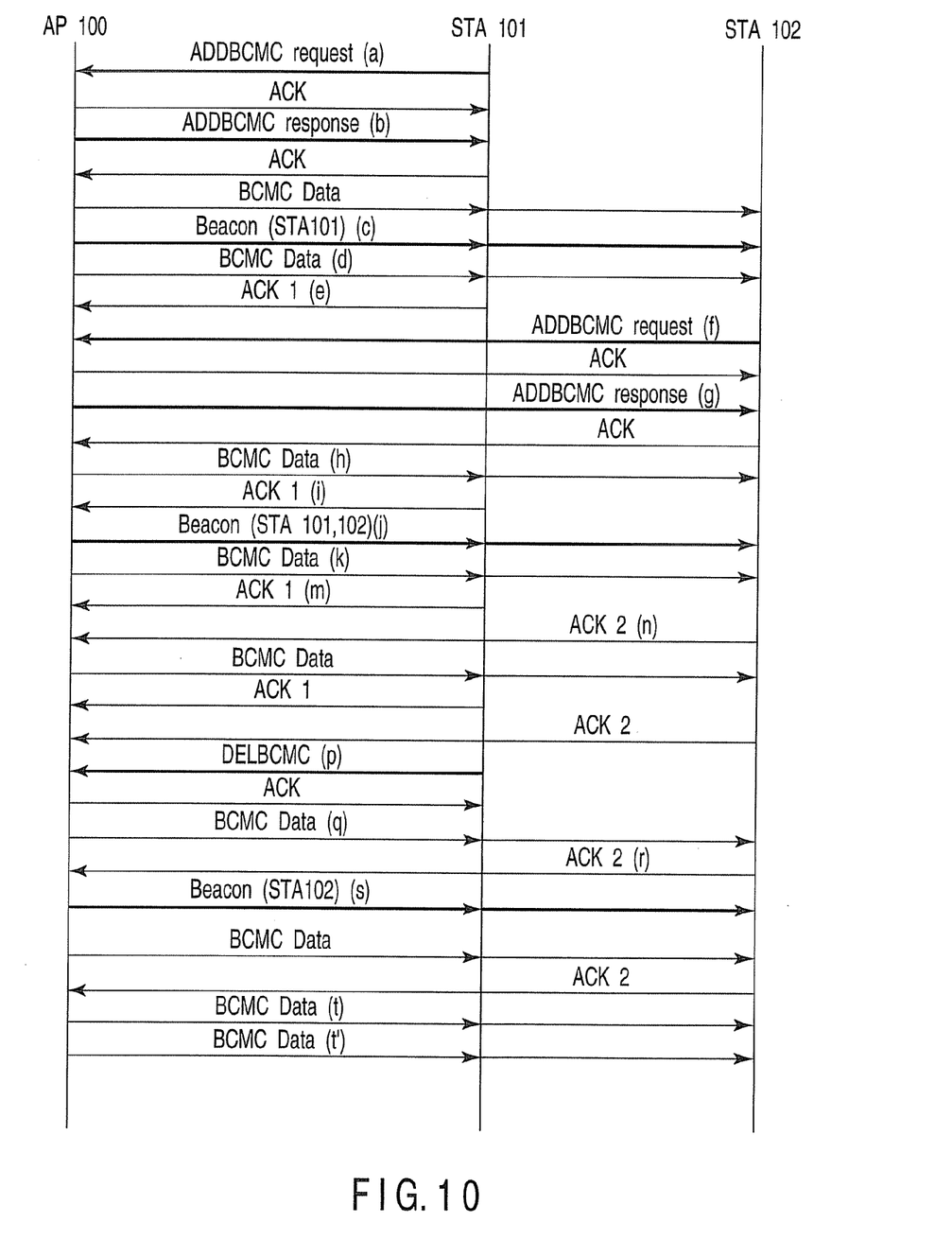
FIG. 10 is a view illustrating a protocol sequence (in using a Beacon frame) in the wireless communication equipment system depicted in FIG. 1.

FIG. 10 illustrates a protocol sequence (in using a Beacon frame) in the case of the operation of the control protocol in the embodiment. FIG. 10 shows a sequence (an aspect of an operation of the control protocol) when it is set so that the AP 100 can transmit the ACK frames (ACK1 and ACK2) to the BCMC data frame resulting from that the two STAs 101, 102 transmit the ADDBCMC request frames. Hereinafter, the order of the ACK frame transmissions will be described in accordance with the case in which the order of the ACK frame transmissions is set as the reception order of the ADDBCMC request frames.

More specifically, the SAT 101 that is an arbitrary slave station intending to transmit the ACK frames to the BCMC data frames transmits an ADDBCMC request frame (a) to the AP 100. The AP 100 which has receives the ADDBCMC request frame (a) then transmits a response frame (b) to the STA 101. Thereby, the STA 101 which has received the response frame (b) then may establish the ACK frame transmission sequence to the BCMC data frame. However, the STA 101 which has received the ADDBCMC response frame (b) does not perform ACK frame transmissions to the BCMC data frame at this timing.

After this, the AP 100 transmits a Beacon frame (C) to both the STAs 101, 102. From when receiving the Beacon frame (c) transmitted from the AP 100, the STA 101 performs ACK frame transmission (e) to the BCMC data frame (d).

Information (e.g., ACK frame reply timing information) to notify the transmission order at which of timing stations themselves (STAs 101, 102) should perform the ACK frame transmissions is granted as new elements to the Beacon frame. Therefore, by receiving the Beacon frames, both the STAs 101, 102 may know the transmission order (transmission timing) of themselves ACK frames. The ACK frame transmissions are enabled at the timing of receiving the Beacon frames.

Similarly, in the case in which the STA 102 that is an arbitrary station transmits the ADDBCMC request frame (f) and intends to establish the ACK frame transmission sequence to the BCMC data frame, the STA 102 does not transmit the ACK frame to the BCMC data frame jus after the establishment of the ACK frame transmission sequence. In short, after receiving an ADDBCMC response frame (g), the STA 102 can firstly perform an ACK frame transmission (n) to a BCMC data frame (k) at the stage in which the STA 102 receives a Beacon frame (j) informing the transmission order of the ACK frames.

In other words, until the STA 102 receives the Beacon frame (j), only an ACK frame transmission (i) from the STA 101 is performed with respect to a BCMC data frame (h). After receiving the Beacon frame (j), in order of the STA 101 and the STA 102, an ACK frame transmission (m) and an ACK frame transmission (n) to the BCMC data frame (k) are performed. At this moment, after the elapse of a prescribed time after receiving the BCMC data frame (k), for example, a sufficient time period to complete the ACK frame transmission (m) from the STA 101, the STA 102 performs the ACK frame transmission (n). Thereby, The STAs 101, 102 may prevent the ACK frames from conflicting with each other.

In contrast, when the STA 101 intends to stop the ACK frame transmission (m) (to release the ACK frame transmission sequence) to the BCMC data frame, the STA 101 transmits a DELBCMC frame (p) to the AP 100. In this case, the STA 101 quickly stops the ACK frame transmission without having any relation to the succeeding Beacon frame (s). That is, after transmitting the DELBCMC frame (p), only the STA 102 performs a ACK frame transmission (r) to a BCMC data frame (q). Thus, in the succeeding ACK frame transmissions, the order of transmissions is increased in priority and updated from order of STA 1 and STA 102 into only STA 102.

Although a BCMC data frame (t) has been transmitted, if the AP 100 cannot receive the ACK frame transmissions from the STA 102, the AP 100 determines this situation as an occurrence of a frame loss to re-transmit a BCMC data frame (t'). Thus, upon the occurrence of the frame loss, the STA 102 may easily re-transmit a frame. The same operation applies to the case in which the ACK transmission sequence to the BCMC data frame has been established.

Figure 11:
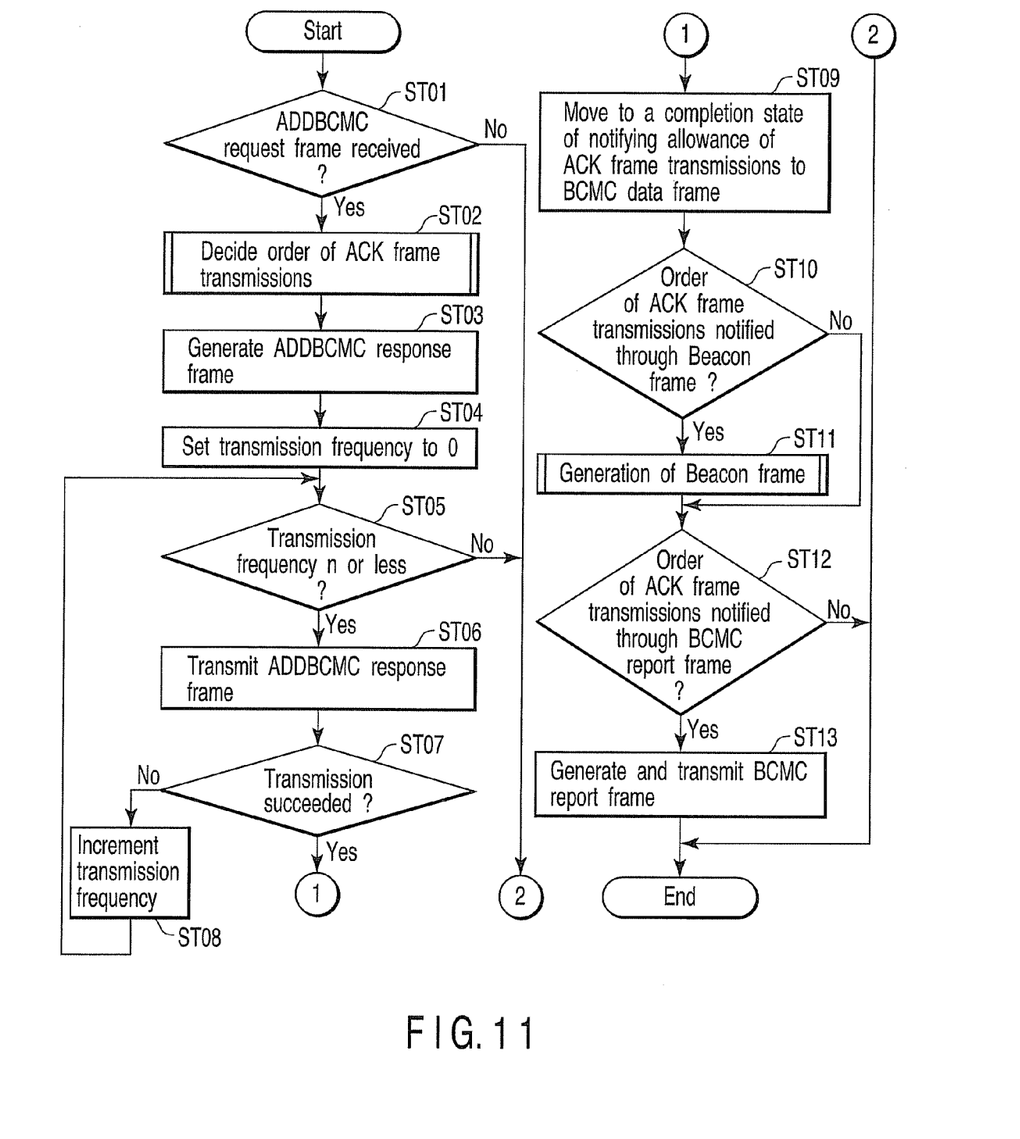
FIG. 11 is a flowchart for explaining a flow of processing at the AP in operating a control protocol in the wireless communication equipment system depicted in FIG. 1.

FIG. 11 depicts for explaining a flow of processing at the AP 100 (an operation to establish a connection capable of conducting the ACK frame transmissions to the BCMC data frame) in operating the control protocol of the aforementioned embodiment.

The AP 100 determines whether or not the ADDBCMC frame from the STA 101 or STA 102 has received in Step ST01. When the AP 100 determines that it has not received the ADDBCMC request frame, the AP 100 terminates its processing directly.

On the contrary, when the AP 100 determines that it has received the ADDBCMC request frame, the AP 100 decides the order of the ACK frame transmissions in Step ST02.

The AP 100 then generates the ADDBCMC response frame in Step ST03.

The AP 100 then sets the transmission frequency of the ADDBCMC response frames to '0' in Step ST04.

The AP 100 then determines whether or not the transmission frequency of the ADDBCMC response frames is equal to a prescribed 'n' or less in Step ST05. When the transmission frequency of the ADDBCMC response frames is more than 'n', the AP 100 terminates its processing directly.

If the transmission frequency of the ADDBCMC response frames is not more than 'n', the AP 100 transmits the ADDBCMC response frames in Step ST06.

The AP 100 then determines whether or not the transmissions of the ADDBCMC response frames have succeeded or not in Step ST07. If the transmissions have not succeeded, the AP 100 increments the transmission frequency then repeats the processing after Step ST05.

On the contrary, when succeeding the transmissions, the AP 100 moves into a completion state of notifying an allowance of the ACK frame transmissions to the BCMC data frame in Step ST09. The AP 100 repeats the operations from Step ST01 to Step ST09 for each STA which has received the ADDBCMC request frame.

The AP 100 then determines whether or not the Beacon frame notifies the order of the ACL frame transmissions in Step ST10. If the AP 100 does not notify it, the AP 100 shifts to the processing in Step ST12. If the AT 100 notifies it, the AP 100 generates and transmits the Beacon frame in Step ST11.

The AP 100 then determines whether or not the BCMC report frame notifies the transmission order of the ACK frames in Step ST12. If the BCMC report frame does not notify, the AP 100 terminates the processing directly.

Otherwise stated, the AP 100 generates and transmits the BCMC report frame in Step ST13 (refer to second embodiment given below). The AP 100 then terminates the processing. In other words, if the AP 100 has generated and transmitted the Beacon frame in the foregoing Step ST11, the AP 100 does not generate and transmit the BCMC report frame (refer to first embodiment given above).

Figure 12:
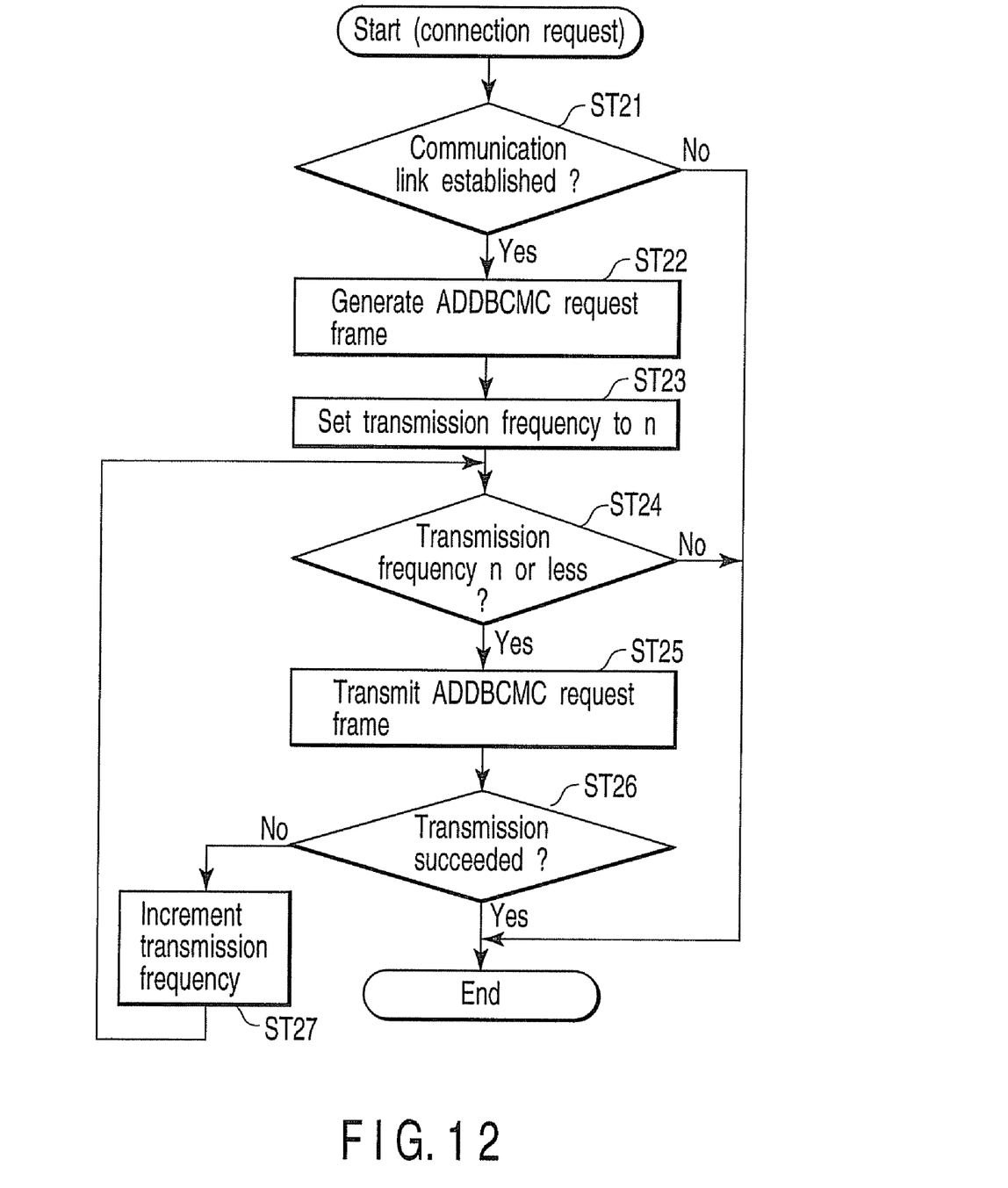
FIG. 12 is a flowchart for explaining a flow of processing (in requesting) at a station (STA) in operating the control protocol in the wireless communication equipment system depicted in FIG. 1.

FIG. 12 illustrates for explaining flows of processing (operations in requesting for establishing a connection capable of transmitting the ACK frames to the BCMC data frame) at the STAs 101, 102 in operating the control protocol of the foregoing embodiment.

At first, the STAs 101, 102 determine whether the communication link has already been established. If it is determined that the communication link has not been established, the processing is terminated directly.

On the contrary, if it is determined that the communication link has been established, the STAs 101, 102 generate the ADDBCMC request frames in Step ST22.

The STAs 101, 102 set the transmission frequency of the ADDBCMC request frames to '0' in Step ST23.

The SATs 101, 102 determine whether or not the transmission frequency of the ADDBCMC request frames is not more than a prescribed 'n' in Step ST24. If the transmission frequency of the ADDBCMC request frames is more than 'In', the processing is terminated as it is.

If the transmission frequency of the ADDBBCMC request frames in not more than 'n', the STAs 101, 102 transmit the ADDBCMC request frames in Step ST25.

The STAs 101, 102 determine whether the transmissions of the ADDBCMC request frames have completed successfully or not in Step ST26. If the transmissions have not completed successfully, the STAs 101, 102 increment the transmission frequency in Step ST27 then they repeat the processing after the forgoing Step ST24. Otherwise stated, the processing is terminated.

Figure 13:
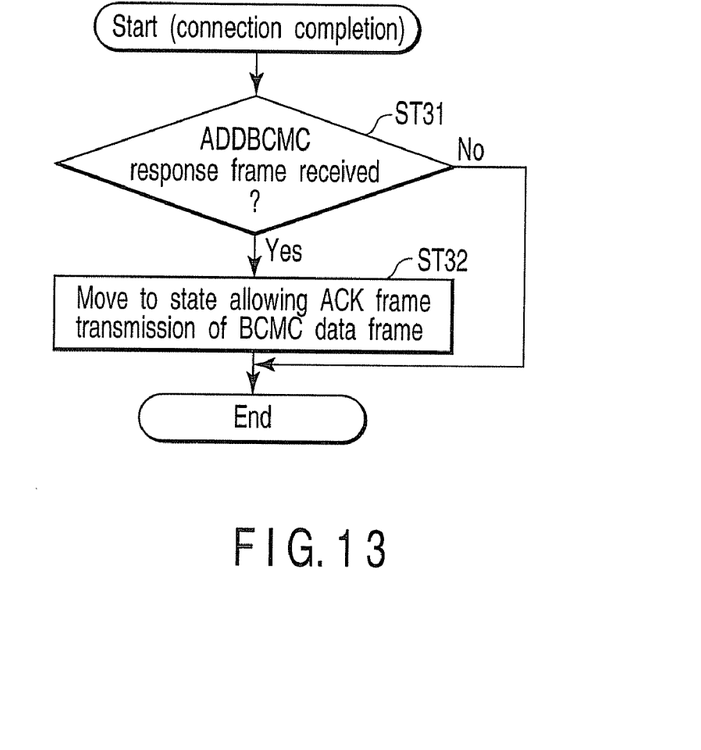
FIG. 13 is a flowchart for explaining a flow of processing (in establishing) at the STA in operating the control protocol in the wireless communication system depicted in FIG. 1.

FIG. 13 illustrates for explaining a flow of processing (operations in establishing so as to establish a connection enabling the ACK frame transmissions to the BCMC data frame) at the STAs 101, 102 in operating the control program of the foregoing embodiment.

At first, the STAs 101, 102 determine whether or not the transmissions of the ADDBCMC request frames have received in a state of success in the transmission of the ADDBCMC request frame in Step ST31. If they determine that the ADDBCMC response frames have not been received, they terminate the processing directly.

On the contrary, if the STAs 101, 102 determine the reception of the ADDBCMC response frames, they transit to states allowing the ACK frame transmissions to the BCMC data frame in Step ST32.

Figure 14:
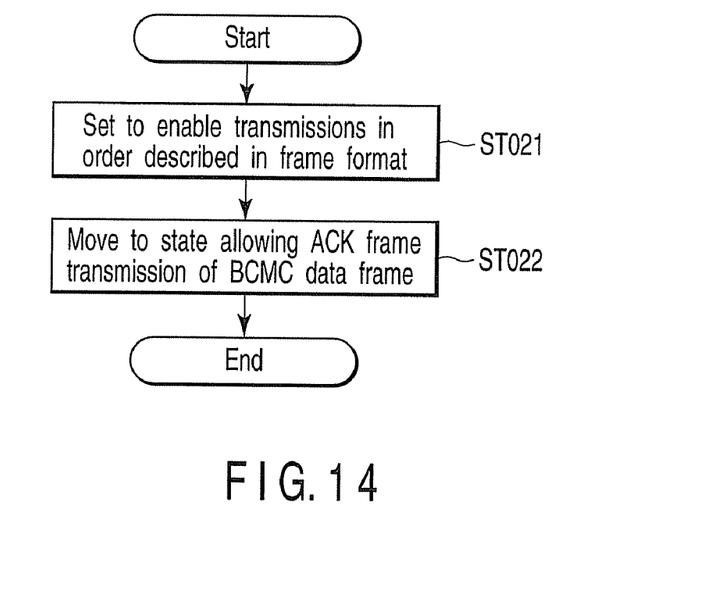
FIG. 14 is a flowchart for explaining a flow of processing regarding an operation in deciding order of ACK frame transmissions at the AP in the wireless communication equipment system depicted in FIG. 1.

FIG. 14 illustrates a flow of processing regarding the operation (Step ST02 of FIG. 11) in deciding the order of the ACK frame transmissions by means of the AP 100. Here, the case in which the AP 100 has set the order so as to transmit the ACK frames in STA order described in the frame format.

When determining the reception of the ADDBCMC request frame (in Step ST01), the AP 100 firstly sets so as to enable the ACK frames to be transmitted in order of STAs described in the frame format in Step ST021.

After this, the AP 100 moves into the state allowing the ACK frame transmissions to the BCMC data frame in Step ST022, then, terminates the processing.

As regard a transmission order decision algorithm of the ACK frame transmissions, a method not depending on the description order of the STAs, but a method depending on the reception order of the ADDBCMC request frames is a possible approach. That is to say, the AP 100 may set so as to perform the ACK frame transmissions in order of receptions of the ADDBCMC request frames.

The AP 100 may give the order of priority for the STAs in advance, and may set so as to perform the ACK frame transmissions starting from the STA with the highest priority.

Figure 15:
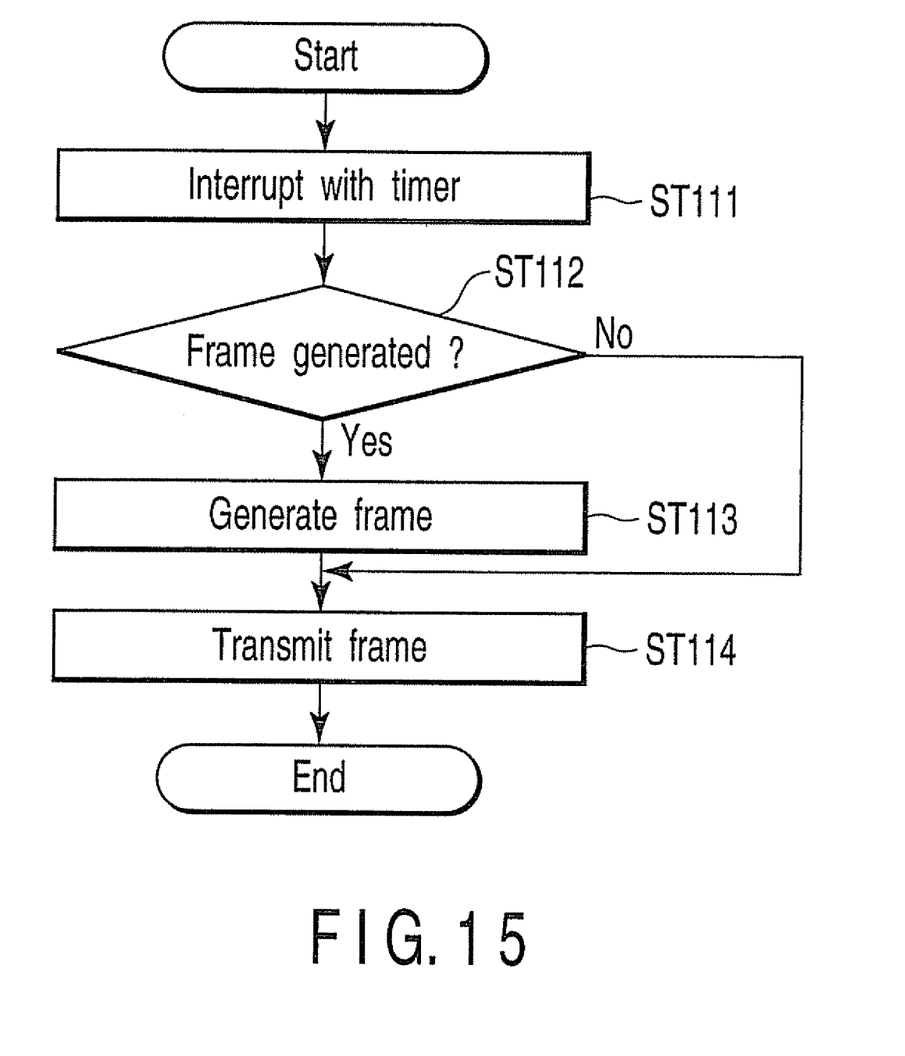
FIG. 15 is a flowchart illustrating for explaining a flow of processing regarding generations and transmissions of Beacon frames at the AP in the wireless communication equipment system depicted in FIG. 1.

FIG. 15 shows a flow of processing regarding the generation and transmission of the Beacon frame (Step St11 in FIG. 11) at the AP 100.

When notifying the order of the ACK frame transmissions through the Beacon frame in the foregoing Step ST10, the AP 100 interrupts by a timer (not depicted) in Step ST111.

The AP 100 then determines whether it is needed to generate the Beacon frame in Step ST112. If there is no need to generate it, for example, in the case in which the Beacon frame has already been generated, the processing shifts to Step ST114.

Otherwise stated, the AP 100 generates the Beacon frame in accordance with the decision (setting) of the foregoing order of the ACK frame transmissions in Step ST113.

Finally, the AP 100 transmits the Beacon frame to each STA 101, 102 and terminates the processing in Step ST114.

As mentioned above, by operating the control protocol of the embodiment, the AP 100 enables the ACK frame transmissions to the BCMC data frame without collisions, and simply enables transmission acknowledgement to the broadcast frame and the multicast frame under the wireless LAN communication. In other words, in the broadcast system and the multicast system stated in the IEEE 802.11 standards of the wireless LAN communication, the wireless communication equipment system in the first embodiment prevents collisions within a wireless section (band) of the ACK frames, and enables normally transmitting the ACK frames to the AP while controlling the order of the ACK frame transmissions from the side of the STAs. Thereby, the side of the AP may easily recognize whether the side of the STA has received the frames. Therefore, the communication system may easily perform the re-transmission of the frame in occurring the frame loss, wherein the re-transmission was disabled when the ACK frame transmissions to the BCMC data frame was impossible.

The communication system not only may establish the ACK frame transmission sequence to the BCMC data frame but also may easily release the ACK frame transmission sequence, and may efficiently use the radio band.

Especially, introducing the foregoing control protocol makes it possible to drastically control the radio band. Thereby, the communication system may flexibly control the establishment and the release thereof, and may allow a user (operator) to easily use the communication system and may effectively use the radio band.

The communication system is configured to notify the timing of the ACK frame transmissions to the BCMC data frame also to other STAs. In other words, expanding the system of the ACK frame transmissions which has been used for the existing wireless LAN communication enables easily corresponding to the wireless communication equipment system without needing the setting operation by the operator.

Second Embodiment

Figure 16:
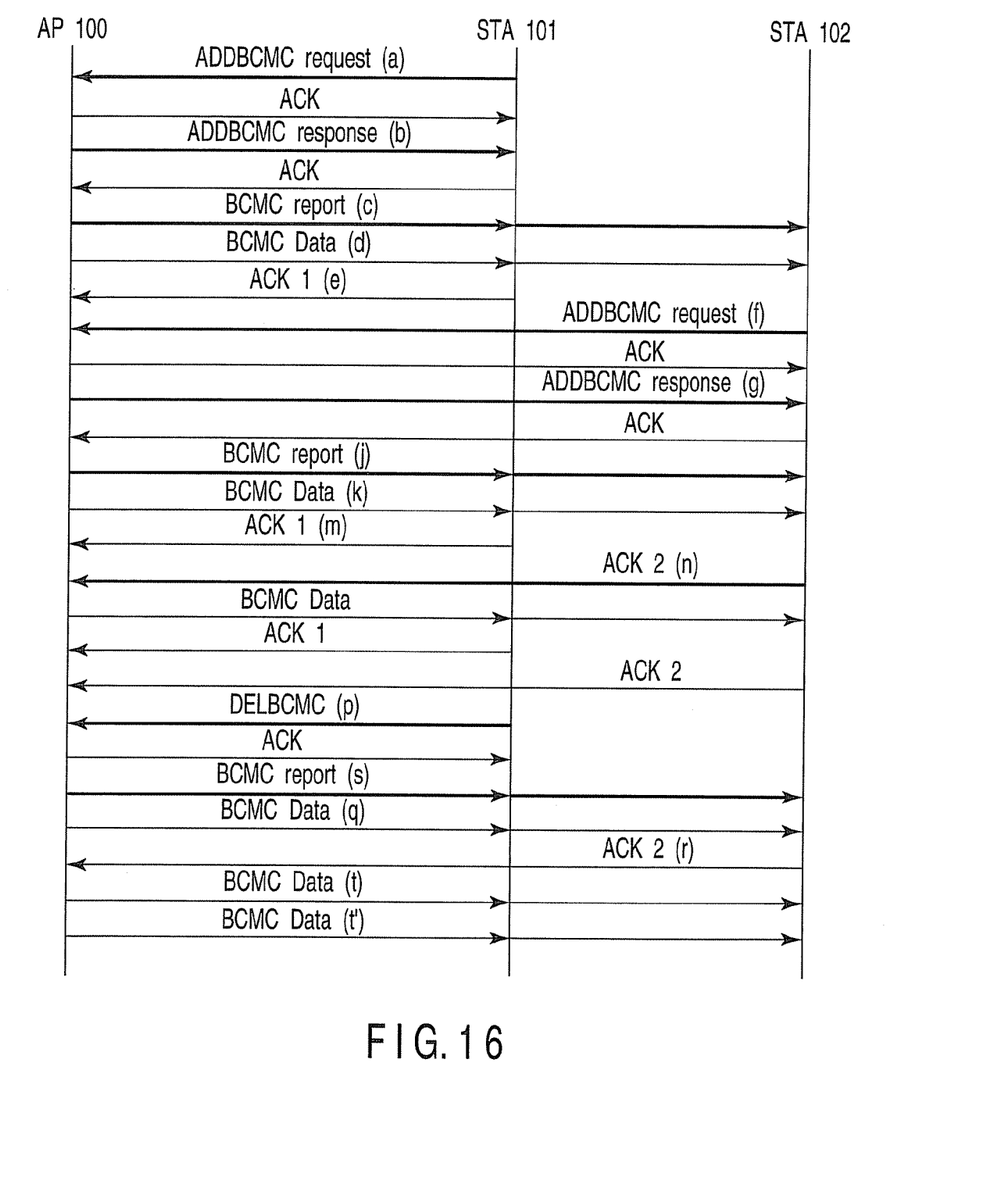
FIG. 16 is a view illustrating a protocol sequence (in using BCMC report frame) in a wireless communication equipment system according to the second embodiment of the present invention.

FIG. 16 illustrates a protocol sequence in the case in which the BCMS report frame is used in a wireless communication system according to the second embodiment of the present invention. The second embodiment is an example in the case in which the wireless communication system shown in the first embodiment notifies the order of the ACK frame transmissions through the BCMC report frame instead of the Beacon frame. As regards the example, the case in which the order of the ACK frame transmissions is set to the order of the ADDBCMC request frame receptions will be described.

The second embodiment mainly differs from the first embodiment in a point that time-lag with respect to the Beacon frame transmission may be shortened when the BCMC report frame is brought into use. Transmitting/receiving the ADBCMC request frame (a)/response frame (b) brings the STA 101 that is an arbitrary slave station is brought into a state enabling the ACK frame transmission to the BCMC data frame (establishment of ACK frame transmission sequence).

In this state, the AP 100 immediately transmits the BCMC report frame (c) to notify the order of the ACK frame transmissions to the STAs 101, 102. Thereby, the STA 101 establishes a state allowing the ACK frame transmission (e) to the BCMC data frame (d).

Since the operations are almost the same as those depicted in FIG. 10, the detail will be omitted.

Thus, by using the BCMC report frames to be transmitted on an irregular base, the communication system may immediately shift the STA to a state capable of transmitting the ACK frames to the BCMC data frames in comparison to the Beacon frames to be transmitted on an irregular base by the interruption with the timer. Therefore, under the wireless LAN communication environment, the communication system may simply conduct the transmission confirmation to the broadcast frame and the multicast frame, and also may sufficiently use the radio section.

In both the aforementioned first and second embodiments, the cases that the STAs are moved into the states capable of conducting the ACK frame transmissions to the BCMC data frames in response to the requests from the SAT sides. However, the invention is not limited to such cases, to configure the communication system to shift into a state capable of performing the ACK frame transmissions to the BCMC data frames depending on the request from the AP side.

The number of STAs placed within one BSS is not limited to two or eight, in usually, it is preferable to configure the wireless communication equipment system provided with around sixteen STAs.

While the foregoing embodiments have been described in the case in which the ACK frames are transmitted as acknowledgement responses to the BCMC data frames, it may also be configured to transmit, for example, Block ACK (BA) frames that are acknowledgement responses in transmitting burst which are used in the IEEE 802.11e standards of the wireless LAN communication.

Furthermore, in the case where the AP transmits MC data frames to a plurality of STAs, according to the wireless LAN communication environment, it is considered to be that a part of the ACK frames from each of the STAs does not reach the AP. In such a case, although the AP re-transmits the frame, as regards a method of a re-transmission, the invention is not limited to the case of re-transmissions of MC data frames as they are. As regarding the transmissions of the MC data frames from the AP, each STA transmits the ACK frame for the MC data frame to the AP. Such a case in which the AP may receive an ACK frame transmitted from a certain STA; however, the AP cannot receive an ACK frame from another STA sometimes. In this case, the AP has to transmit the same dada again. At this moment, the variations in situation decides whether the MC data frames should be re-transmitted to the STA which could not receive the ACK frame, or whether a unicast frame should be re-transmitted thereto.

Hereinafter, some specific examples will be simply described. For instance, when a frame loss occurs in an ACK frame from the STAL in transmitting the MC data frames from one AP 100 to two STAL and STA2, it is preferable for the AP 100 to re-transmit the UC data frame to the STAL. For instance, in transmitting the MC data frames from one AP 100 to two STAL and STA2, if the frame loss occurs in the ACK frame from the STAL and STA2, it is preferable that the BCMC data frame is re-transmitted from the AP 100 to the STAL and STA2. For instance, in transmitting the MC data frame from one AP 100 to three STA1, STA2 and STA3, in the case of occurrences frame losses in the ACK frames from the STA1, STA2 and STA3, it is preferable that the BCMC data frames are re-transmitted from the AP 100 to the STA1, STA2 and STA3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication equipment system, which performs wireless communication among one master station and more than one slave station, comprising, wherein
each of the slave stations requests the master station to assign acknowledgement mode so as to send acknowledgement frame to broadcast frames or multicast frames transmitted from the master station;
the master station is configured to decide order of replies of the acknowledgement frames for the slave stations which have requested the replies of the acknowledgement frames and to notify the order of the replies of the acknowledgement frames and
each of the slave stations is configured to request the master station so as to terminate replies of the acknowledgement frame,
wherein each of the slave stations uses a frame of which the function has been expanded on the basis of a frame compliant with IEEE 802.11 standards of wireless local area network communication so as to be configured to request the master station to terminate the reply of the acknowledgement frame.

2. The system according to claim 1, wherein
each of the slave stations uses a frame of which the function has been expanded on the basis of a frame compliant with IEEE 802.11 standards of wireless local area network communication so as to be configured to request the master station to reply the acknowledgement frame.

3. The system according to claim 1, wherein
the master station uses a Beacon frame to be periodically transmitted from the master station configured to notify order of replies of the acknowledgement frames.

4. The system according to claim 1, wherein
the master station uses broadcast and multicast (BCMC) report frames to be transmitted on an irregular base so as to notify order of replies of the acknowledgement frames.

5. The system according to claim 1, wherein
the master station is further configured to re-transmit the broadcast frames or the multicast frames if the acknowledgement frames from the slave stations which have requested the replies of the acknowledgement frames cannot be received.

6. A wireless communication sequence of a wireless communication equipment system which performs wireless communication among one master station and more than one slave station, comprising:
requesting the master station to assign acknowledgement mode so as to send acknowledgement frame to broadcast frames or multicast frames from arbitrary slave station among the slave stations,
establishing a transmission sequence of acknowledgement frames among the master station and the arbitrary station by replying from the master station to the request;
deciding order of the replies of the acknowledgement frames from the master station to the arbitrary slave station:
using Beacon frames to be transmitted periodically from the master station or broadcast and multicast (BCMC) report frames to be transmitted on an irregular base and notifying order of replies of the acknowledgement frames to all the slave stations;
transmitting the broadcast frames or multicast frames from the master station to all the slave stations;
transmitting the acknowledgement frames from the arbitrary slave station to the broadcast frames or the multicast frames transmitted from the master station in response to the order of the replies of the acknowledgement frames, and
each of the slave stations requests the master station to terminate replies on the acknowledgement frames,
wherein when each of the slave stations requests of the master station to terminate the replies of the acknowledgement frames, each of the slave stations uses a frame of which the function is expanded on the basis of a frame compliant with IEEE 802.11 standards of wireless local area network communication.

7. The sequence according to claim 6, further using a frame of which the function is expanded on the basis of a frame compliant with IEEE 802.11 standards of wireless local area network communication when the arbitrary slave station requests the master station to reply the acknowledgement frames.

8. The sequence according to claim 6, wherein the master station further re-transmits the broadcast frames or the multicast frames when the acknowledgement frames from the arbitrary slave station which has requested the replies of the acknowledgement frames cannot be received.

* * * * *